United States Patent [19]

Smith et al.

[11] Patent Number: 5,633,729
[45] Date of Patent: May 27, 1997

[54] PROCESSES FOR MINIMIZING THE QUANTIZATION ERROR IN MULTI-LEVEL HALFTONE TRANSFER FUNCTIONS

[75] Inventors: Craig M. Smith, Tokyo, Japan; Rodney L. Miller, Fairport, N.Y.

[73] Assignee: Eastman Kodak Company, Rochester, N.Y.

[21] Appl. No.: 362,324

[22] Filed: Dec. 22, 1994

[51] Int. Cl.$^6$ .................................................. H04N 1/40
[52] U.S. Cl. ......................... 358/456; 358/457; 358/460
[58] Field of Search .................................. 358/456, 457, 358/448, 453, 462, 455, 443, 463, 461, 433, 460, 465, 298, 518, 517

[56] References Cited

U.S. PATENT DOCUMENTS

| | | | |
|---|---|---|---|
| 3,953,668 | 4/1976 | Judice | 178/6 |
| 4,736,254 | 4/1988 | Kotera et al. | 358/283 |
| 4,876,611 | 10/1989 | Fischer et al. | 358/456 |
| 4,891,714 | 1/1990 | Klees | 358/456 |
| 4,910,603 | 3/1990 | Hirahara et al. | 358/298 |
| 4,912,562 | 3/1990 | Femester et al. | 358/298 |
| 4,920,501 | 4/1990 | Sullivan et al. | 364/518 |
| 4,939,589 | 7/1990 | Fischer et al. | 358/448 |
| 4,951,159 | 8/1990 | Van Beek | 348/455 |
| 4,953,013 | 8/1990 | Tswi et al. | 358/75 |
| 4,955,065 | 9/1990 | Ulichney | 382/50 |
| 4,956,638 | 9/1990 | Larky et al. | 340/701 |
| 4,992,955 | 2/1991 | Yabuuchi et al. | 364/518 |
| 5,014,138 | 5/1991 | Fischer et al. | 358/448 |
| 5,014,333 | 5/1991 | Miller et al. | 382/54 |
| 5,023,729 | 6/1991 | Kumagai | 358/457 |
| 5,027,078 | 6/1991 | Fan | 358/456 |
| 5,031,051 | 7/1991 | Chan | 358/298 |
| 5,041,920 | 8/1991 | Hayes et al. | 358/456 |
| 5,050,000 | 9/1991 | Ng | 358/298 |
| 5,051,844 | 9/1991 | Sullivan | 358/456 |

(List continued on next page.)

FOREIGN PATENT DOCUMENTS

| | | |
|---|---|---|
| 59-161183 | 4/1983 | Japan. |
| 60-26966 | 2/1985 | Japan. |
| 60-145767 | 8/1985 | Japan. |
| 61-15466 | 1/1986 | Japan. |
| 62-289054 | 12/1987 | Japan. |
| 63-157558 | 6/1988 | Japan. |
| 63-316974 | 12/1988 | Japan. |
| 1-155771 | 6/1989 | Japan. |

OTHER PUBLICATIONS

Ulichney, "Digital Halftoning", pp. 71–171 (Mit Press, ©1987).

Onishi et al., "The Melfas 850, A High-Speed Facsimile with a Halftone Reproduction Capability", Mitsubishi Denki G140; vol. 54, No. 8, pp. 46–49 (1980).

Primary Examiner—Thomas D. Lee
Attorney, Agent, or Firm—Peyton C. Watkins

[57] ABSTRACT

Improved processes for quantizing a set of mean-preserving Tone Transfer Functions (TTFs) for a multi-level halftoning system which minimize or at least significantly reduce the overall quantization error in the system as a function of a prespecified system halftone cell size, P, and the number of micro output levels, $L_y$, supported by the multi-level halftoning system. The processes call for dividing the range of possible input contone representative intensity values into T subintervals, where $T=PL_y$; determining the values of the centers of the T-subintervals; and quantizing each of the normalized continuous mean preserving TTFs as a function of the values of the centers of the T-subintervals. According to a preferred embodiment, the quantizing is performed such that the quantized TTFs approximate the normalized continuous mean preserving TTFs and ideally satisfy the criteria that the maximum quantization error between any quantized and unquantized TTF is minimized. Further aspects of the invention are directed to methods for determining threshold levels for assignment to threshold matrices, and methods for specifying look-up tables, either of which (the matrices and look-up tables) may be used for converting input contone representative intensity values into a predetermined number of available micro output levels for a multilevel halftone system having a predetermined halftone cell size.

20 Claims, 4 Drawing Sheets

U.S. PATENT DOCUMENTS

| | | | |
|---|---|---|---|
| 5,053,866 | 10/1991 | Johnson | 358/75 |
| 5,070,413 | 12/1991 | Sullivan et al. | 358/456 |
| 5,172,267 | 12/1992 | Ghaderi | 358/456 |
| 5,291,311 | 3/1994 | Miller | 358/456 |
| 5,321,427 | 6/1994 | Agar et al. | 346/76 PH |
| 5,333,069 | 7/1994 | Spence | 358/517 |
| 5,444,551 | 8/1995 | Miller et al. | 358/456 |

| ORIGINAL THRESHOLDS | REQUIRED THRESHOLDS | THRESHOLD POSITION (MATRIX #, POSITION) |
|---|---|---|
| 11 | 11 | 1,1 |
| 34 | 32 | 1,2 |
| 57 | 53 | 2,1 |
| 70 | 74 | 1,3 |
| 102 | 96 | 2,2 |
| 119 | 117 | 1,4 |
| 136 | 138 | 3,1 |
| 153 | 159 | 2,3 |
| 185 | 181 | 3,2 |
| 198 | 202 | 2,4 |
| 221 | 223 | 3,3 |
| 244 | 244 | 3,4 |

| REQUIRED THRESHOLDS normal (8 bit) | QUANTIZATION ERROR | | | | THRESHOLD POSITION (MATRIX #, POSITION) |
|---|---|---|---|---|---|
| | $v_1$ error | $v_2$ error | $v_3$ error | $v_4$ error | |
| 0.042 (11) | 0.167 | 0 | 0 | 0 | 1,1 |
| 0.125 (32) | 0.017 | 0.150 | 0 | 0 | 1,2 |
| 0.208 (53) | 0.144 | -0.056 | 0.078 | 0 | 2,1 |
| 0.292 (74) | -0.078 | 0.056 | 0.189 | 0 | 1,3 |
| 0.375 (96) | 0.008 | 0.142 | -0.058 | 0.075 | 2,2 |
| 0.458 (117) | 0.092 | -0.108 | 0.025 | 0.158 | 1,4 |
| 0.542 (138) | 0.175 | -0.025 | 0.108 | -0.092 | 3,1 |
| 0.625 (159) | -0.075 | 0.058 | 0.192 | -0.008 | 2,3 |
| 0.708 (181) | 0 | 0.144 | -0.056 | 0.078 | 3,2 |
| 0.792 (202) | 0 | -0.078 | 0.056 | 0.189 | 2,4 |
| 0.875 (223) | 0 | 0 | 0.183 | -0.017 | 3,3 |
| 0.958 (244) | 0 | 0 | 0 | 0.167 | 3,4 |

PROCESSES FOR MINIMIZING THE QUANTIZATION ERROR IN MULTI-LEVEL HALFTONE TRANSFER FUNCTIONS

BACKGROUND OF THE INVENTION

1. Field of the Invention

The invention relates generally to processes used in digital halftoning systems to support multi-level halftoning. More particularly, the invention relates to improved processes for quantizing a set of mean-preserving Tone Transfer Functions (TTFs) for a multi-level halftoning system which minimize or at least significantly reduce the overall quantization error in the system.

Further aspects of the invention are directed to methods for determining threshold levels for assignment to threshold matrices and/or methods for specifying look-up tables, either of which (the matrices and look-up tables) may be used for converting input continuous tone representative intensity values into a predetermined number of available micro output levels for a multilevel halftone system having a predetermined halftone cell size.

2. Description of the Related Art

Processes for specifying mean-preserving TTFs for a multi-level halftoning system are described and claimed in copending U.S. patent application Ser. No. 07/918,291, entitled "A Process For Specifying Mean-Preserving Multi-Level Halftone Matrices With Varying Amounts of Modulation", filed on Jul. 22, 1992, now U.S. Pat. No. 5,444,551, issued Aug. 22, 1995 to Miller et al. The aforementioned copending application has been assigned to the present assignee hereof and is hereby incorporated by reference.

The present invention is directed to improvements over the teachings in the incorporated copending patent application (referred to hereinafter as the "Incorporated Application"), which will be better appreciated by first setting forth an overview of state of the art of digital halftoning techniques.

Generally, digital halftoning is accomplished by either bi-tonal or multi-tonal halftoning methods. Bi-tonal halftoning is widely used in the art and is a basic digital halftoning from which multi-toning halftoning methods are derived. Therefore, bi-tonal digital halftoning is discussed below as a precursor to a discussion of multi-tonal halftoning.

In general, bi-tonal halftoning converts a continuous tone image (sometimes referred to hereinafter as a "contone" image) into a halftone image consisting of a pattern of equal intensity dots. Each dot within the halftone image either exists (black) or does not exists (white), i.e., is a bi-tonal image.

More specifically, in one version of halftoning, bi-tonal digital halftoning converts a plurality of digitized intensity values representing a contone image into a plurality of halftone cells, where each halftone cell corresponds to each intensity value.

Moreover, the number of dots within each halftone cell is proportional to the magnitude of each corresponding intensity value. The intensity values are typically generated by periodically sampling a contone image using and optical scanner. Each intensity value represents the image intensity in an immediate area surrounding the location within the contone image from which the intensity value sample was taken.

Typically, each intensity value is quantized into a plurality of levels known as gray scale levels. Quantization permits each intensity value to be represented by a digital value and be processed by digital circuitry into a halftone image. For instance, if the intensity value is quantized into 256 levels, i.e., a 256 level gray scale, the intensity value can be represented by an eight bit digital word.

During bi-tonal halftoning, each intensity value is spatially mapped into a corresponding halftone cell. As noted above, each halftone cell typically encompasses a plurality of pixels, each having a bi-tonal value, i.e., either black or white. However, some applications require the number of intensity values to equal the number of pixels in the halftone cell, i.e., equal scanner and halftone resolutions. Generally speaking, regardless of the application, the arrangement of pixels in the halftone image is perceived by a viewer of the halftone image to have a gray scale intensity commensurate with the magnitude of each associated intensity value. The above described mapping process is generally known as spatial modulation.

In one prior art embodiment, a bi-tonal halftoning system operates by comparing each intensity value sample to a matrix of threshold levels and generates a halftone cell corresponding to each intensity value. Typically, this matrix has a number of elements equivalent to the number of pixels in the halftone cell. To generate the bi-tonal halftone cell, a given intensity value is compared to each threshold level in the matrix. Each pixel in the halftone cell, that corresponds to a threshold level in the threshold matrix and is lesser in value than the intensity value, could be made black; in which case each pixel in the halftone cell, that corresponds to a threshold level in the threshold matrix and is greater or equal in value when compared with the intensity value would be made white.

Thus the intensity value is mapped into an area comprised of an arrangement of black and white pixels whose overall intensity is commensurate with the magnitude of the intensity value.

The arrangement of threshold levels within the threshold matrix is generally known as dithering, more specifically, in two common forms: clustered dot dithering and dispersed dot dithering. In essence, through dithering, the threshold levels are arranged to ensure that the resultant halftone pixels that will be generated for a given cell will accurately reflect the intensity of the input intensity value associated with that cell. For a detailed discussion of dithering in bi-tonal systems, see Ulichney, *Digital Halftoning*, pp. 71–171 (MIT Press, copyright 1987).

The matrix comparison process, as described above, is repeated for each intensity value sampled from the original contone image. As a result, the entire image is spatially modulated into a halftone image comprised of a tile like arrangement of halftone cells each representing a different corresponding intensity value sample.

As is well known in the art, the halftoning process thus far described is useful in halftoning color images by repeating the bi-tonal process for each primary color, i.e., red, blue and green or cyan, magenta and yellow, and, subsequently overlaying the resulting color images with proper registration.

Multi-level halftoning is an extension of bi-tonal halftoning. As its name implies, multi-level halftoning replaces each black or white pixel in a bi-tonal halftone cell with a pixel having a value selected from a number of values available for each pixel. In essence, multi-level halftoning redistributes the intensity of a single intensity value into a plurality of intensity values within a halftone cell. Many display devices permit multi-level pixel display; multi-level halftoning takes advantage of this capability. For example, thermal printers are capable of printing dot sizes that correspond to each pixel intensity level. Additionally, cathode ray tube (CRT) displays can display various pixel intensities by altering an electron beam strength incident upon each pixel within the CRT display.

Typically, display devices are limited as to the number of levels that they can display. In contrast, sampling devices can produce many different output levels. Therefore, multi-level halftoning is used to convert a large number of output levels from a sampling device into a lesser number of levels compatible with a display device. For instance, if a display device can accurately display five levels while a scanner can provide a 256 level intensity value, a multi-level halftoning system must distribute each single 256 level value into a halftone cell, containing a plurality of five level pixels, that, when viewed, appears as the 256 level value.

To determine the appropriate level for each pixel in a multi-level halftone cell, an input intensity value is compared to a number of threshold matrices, i.e., N−1 matrices are used to generate N levels. Generally, the comparison process is similar to that used in bi-tonal halftoning except that the comparison process is repeated N−1 times for N−1 matrices. As in bi-tonal halftoning, each matrix contains, as matrix elements, a number of different threshold levels. The number of matrix elements is equivalent to the number of pixels in the halftone cell. The output of each comparison is a digital bit, i.e., a signal having a value of either a logical "1" or logical "0". The output bit value indicates whether the intensity value is greater than the threshold level, i.e., logical "1", or less than the threshold level, i.e., logical "0". Each output bit is stored in an intermediate matrix. Thus a set of N intermediate matrices containing digital bits is generated. An encoder combines the elements of the intermediate matrices to generate the pixel values for a halftone cell.

For example, an intensity value may be quantized by an 8-bit scanner to have a value between 0 and 255. The intensity value is compared to four matrices. Each matrix contains threshold levels arranged in a 4-by-4 matrix having various threshold levels ranging from 0 to 255.

Comparing each threshold level in each matrix to the intensity value results in four intermediate matrices containing digital values. The elements of each intermediate matrix are valued at a logical "1" whenever the intensity value is larger than the corresponding threshold level; otherwise a logical "0" is used as the matrix element. In essence, the four intermediate matrices are four bi-tonal halftone cells. The elements of each intermediate matrix having the same coordinates are combined to form a 4-bit word. Each 4-bit word is then encoded to generate a halftone output value for a pixel in the multi-level halftone cell. The resulting pixel value will range from 0 to 4, i.e., one level for each threshold matrix with one level to signify the absence of a pixel.

As in the case of bi-tonal halftoning, the threshold levels are placed in a dither pattern within each threshold matrix. The dither patterns are essentially the same as those used in bi-tonal halftoning, i.e., clustered-dot dither or dispersed-dot dither.

In the past, threshold levels in each matrix of a multi-level halftoning system were generated manually. These levels could be arranged using empirical methods to achieve a desired intensity value to halftone cell conversion. The number of threshold levels that needed to be specified is (m×n)(N−1), where: N is the number of desired output levels, and m and n are the dimensions in matrix elements of the threshold matrices. In practice, the number of threshold levels that must be generated can be quite large. For example, a system having 12 output levels with 8-by-8 element matrices requires that 704 threshold levels must be specified and then be properly arranged in each of 11 threshold matrices.

Moreover, to accomplish each intensity value comparison, N−1 comparator circuits associated with N−1 modulation matrices were used to produce an N-level output. Thus a conventional multi-level halftone system required a dedicated number of comparators and associated matrices to generate each of the output levels. Consequently, each halftoning system needed to be designed to accommodate a specific number of output levels to drive a specific display device. Thus, a single multi-level halftone image generating system could not be readily altered to accommodate any number of output levels and was rather inflexible.

A specific need existed in the art for apparatus and related processes that generated multi-level output values for pixels in a halftone cell in a manner which readily accommodated any number of output levels. This need was met by the teachings in U.S. Pat. No. 5,291,311, assigned to the same assignee as the present invention.

U.S. Pat. No. 5,291,511 teaches apparatus which generates multi-level values without using an arrangement of comparators and threshold matrices.

Additionally, a need existed in the art for apparatus that automatically generated threshold levels for each of the threshold matrices. This need was met by the Incorporated Application which also teaches how to specify look-up tables which are useful in converting input contone representative intensity values into a predetermined number of available micro output levels for a multilevel halftone system having a predetermined cell size.

According to the teachings of the Incorporated Application, a mean-preserving constraint, which is defined in terms of the number of positions in the halftone cell, is used to generate TTFs for each position in the halftone cell. Each TTF was quantized based on the number of micro output levels (modulation levels); however each TTF was quantized independently leading to a potential summed system quantization error which could be significant.

In view of the state of the art as illustrated it is desirable to provide improved methods for quantizing a set of mean-preserving TTFs for a multi-level halftoning system which minimize or at least significantly reduce the overall quantization error in the system.

Furthermore, in view of the state of the art, it would be desirable to provide methods for determining threshold levels for assignment to threshold matrices which may be used for converting input continuous tone representative intensity values into a predetermined number of available micro output levels for a multilevel halftone system having a predetermined halftone cell size.

Still further, it would be desirable to provide methods for specifying look-up tables which may be used for converting input continuous tone representative intensity values into a predetermined number of available micro output levels for a multilevel halftone system having a predetermined halftone cell size.

Further yet, it is desirable to provide simplified improved methods for quantizing a set of mean-preserving TTFs for a multi-level halftoning system that approximate the TTFs in a near optimal way in systems not capable of supporting computationally intensive quantization processes.

SUMMARY OF THE INVENTION

Accordingly, it is a general object of the present invention to provide methods for performing multi-level halftoning of a continuous tone image.

It is a specific object of the present invention to provide improved methods for quantizing a set of mean-preserving TTFs for a multi-level halftoning system.

A further object of the invention is to provide improved methods for quantizing a set of mean-preserving TTFs for a multi-level halftoning system which minimize or at least significantly reduce the overall quantization error in the system.

A still further object of the invention is to provide methods for determining threshold levels for assignment to threshold matrices which may be used for converting input continuous tone representative intensity values into a predetermined number of available micro output levels for a multilevel halftone system having a predetermined halftone cell size.

Yet another object of the invention is to provide methods for specifying look-up tables which may be used for converting input continuous tone representative intensity values into a predetermined number of available micro output levels for a multilevel halftone system having a predetermined halftone cell size.

Still further objects of the invention are directed to providing simplified improved methods for quantizing a set of mean-preserving TTFs for a multi-level halftoning system that approximate the TTFs in a near optimal way in systems not capable of supporting computationally intensive quantization processes.

According to a first aspect of the invention, a process is specified for quantizing the aforementioned TTFs as a function of a prespecified halftone cell size, P, and the number of micro output levels, $L_y+1$, supported by the multi-level halftoning system.

In particular, according to one embodiment of the invention, the process calls for dividing the range of possible input contone representative intensity values into T subintervals, where $T=PL_y$; determining the values of the centers of the T-subintervals; and quantizing each of the normalized continuous mean preserving TTFs as a function of the values of the centers of the T-subintervals.

According to a preferred embodiment of the invention the quantizing is performed such that the quantized TTFs approximate the normalized continuous mean preserving TTFs and ideally satisfy the criteria that the maximum quantization error between any quantized and unquantized TTF is minimized.

An alternative embodiment of the invention contemplates performing the desired step of quantizing to at least significantly reduce the overall quantization error in the system by:

(a) uniformly quantizing each of the given (P in number) normalized continuous mean preserving TTFs independently to obtain a first set of quantization boundaries;

(b) sorting the first set of quantization boundaries in numerical order (eg., an ascending numerical order);

(c) subsorting the first set of quantization boundaries in numerical order by TTF index i, whenever at least two of the resulting boundaries in the first set of quantization boundaries have the same value; and (d) replacing at least one member of the resulting set of sorted boundary values with at least one member of the set of values of the centers of the T-subintervals.

A still further alternate embodiment of the invention, directed to yet another process for performing the desired step of quantizing to at least significantly reduce the overall quantization error in the system, calls for sequentially approximating, at each quantization boundary, the normalized continuous mean preserving TTFs.

As indicated hereinbefore, further aspect of the invention are directed to methods for determining threshold levels for assignment to threshold matrices, and/or methods for specifying look-up tables, either of which (the matrices and look-up tables) may be used for converting input contone representative intensity values into a predetermined number of available micro output levels for a multilevel halftone system having a predetermined halftone cell size.

The invention features improved methods for creating threshold matrices and look-up tables for mean- preserving multi-level halftoning systems of the type described in the incorporated copending patent application. Since the overall error in the system is minimized, the resulting halftone system will provide a more consistent output over the entire input range. This will result in less banding because each possible output level is produced for an equal range of input values.

The invention also features improved methods for quantizing a set of mean-preserving TTFs for a multi-level halftoning system that approximate the TTFs in a near optimal way in systems not capable of supporting computationally intensive quantization processes.

These and other objects, embodiments and features of the present invention and the manner of obtaining them will become apparent to those skilled in the art, and the invention itself will be best understood by reference to the following Detailed Description read in conjunction with the accompanying drawing.

DETAILED DESCRIPTION

As taught in the Incorporated Application, multi-level halftoning may be performed advantageously by using look-up tables and a preference matrix instead of threshold matrices and comparators. However, the invention will be described hereinafter in the context of processes for performing multi-level halftoning using threshold matrices and comparators, for the sake of illustration only, to facilitate explaining the principals of the invention.

An appropriate architecture for practicing the invention is taught in the Incorporated Application and accordingly will not be further discussed herein.

As indicated hereinbefore, multi-level halftoning is an extension of bi-tonal halftoning. This may be illustrated with reference to FIG. 1 and FIG. 2.

Figure 1:
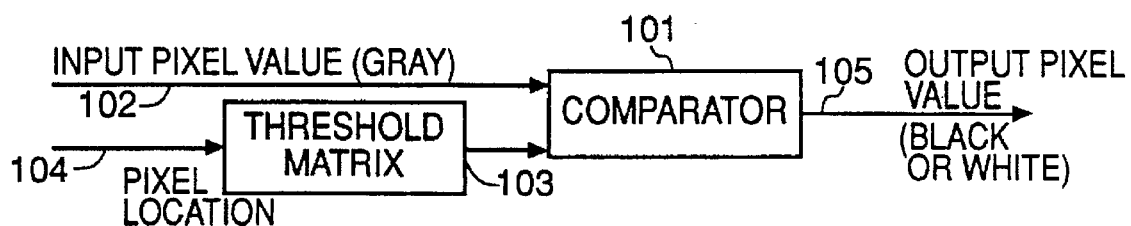
FIG. 1 depicts a prior art bi-tonal halftoning process that utilizes a threshold matrix and comparator.

FIG. 1 depicts a prior art bi-tonal halftoning process that utilizes a threshold matrix and comparator.

In particular, FIG. 1 illustrates a process for comparing (at comparator 101), an input gray level image (102), pixel-by-pixel with a threshold selected from a threshold matrix, 103, based on pixel location, 104; and outputting, 105, a black or white pixel based on the comparison.

The threshold is determined from a matrix of thresholds (103) which is repeated across the image in both directions.

The natural extension of this technique to multi-level halftoning is to use $L_y$ identically sized threshold matrices for $L_y+1$ micro output levels. The threshold values in the same location in each matrix are arranged in numerical (e.g. ascending) order.

Figure 2:
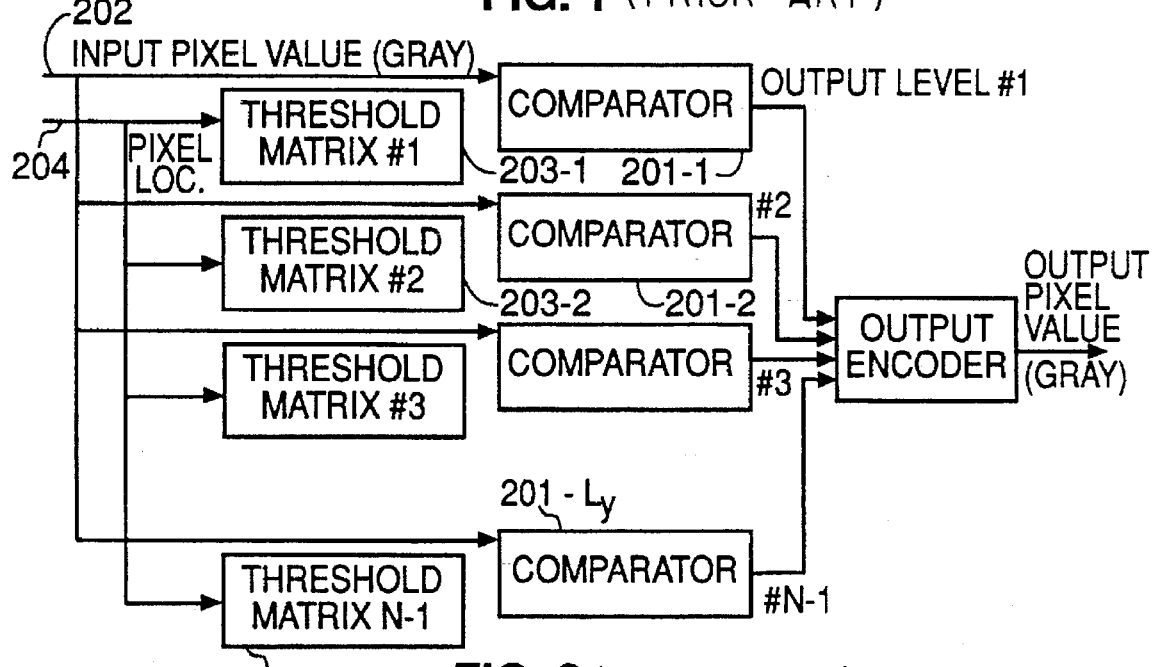
FIG. 2 depicts a prior art multi-level halftoning process that utilizes a plurality of threshold matrices and comparators.

Reference should be made to FIG. 2 which, as indicated hereinbefore, depicts a prior art multi-level halftoning process that utilizes a plurality of threshold matrices and comparators.

The input image data, provided via link 202 in FIG. 2, is compared (at functionally equivalent comparators 201-1 thru 201-$L_y$) with the thresholds selected from matrices 203-1 thru 203-$L_y$. Each of these matrices is most likely a unique array of threshold levels. The comparisons are performed as a function of pixel location (provided via link 204), in order to determine the appropriate output level as shown in FIG. 2, where output levels are numbered 0 to $L_y$ (level 0 is assumed when all compares fail).

Figure 3:
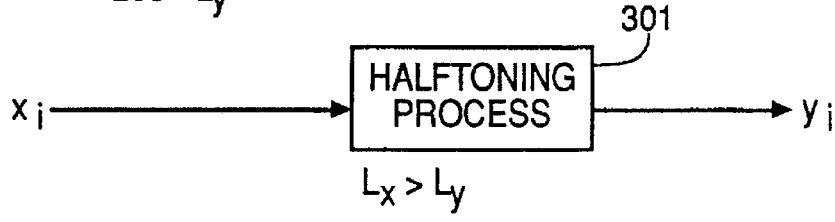
FIG. 3 depicts a halftoning process as a function that operates on integer pixel values, x, which take on values 0 to $L_x$; to produce integer pixel values y, that take on the values 0 to $L_y$, where $L_x > L_y$.

Reference should now be made to FIG. 3 which depicts the halftoning process, whether bi-tonal or multi-level, as a function, represented by box 301. Function 301 (also referred to hereinafter as halftoning process 301) is depicted as operating on integer pixel values, x, which take on values 0 to $L_x$; to produce integer pixel values y, that take on the values 0 to $L_y$, where $L_x > L_y$. A method of specifying the threshold values for the type of halftoning system depicted in FIG. 3 is described in the Incorporated Application which imposes a mean-preserving constraint on the output of the halftoning process.

Figure 4:
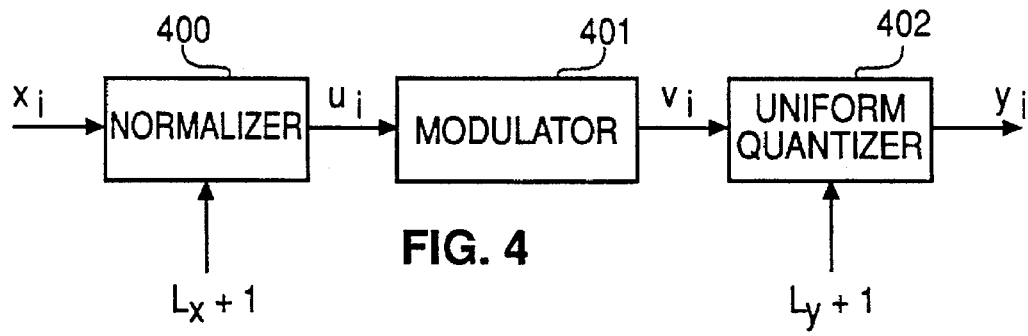
FIG. 4 depicts a detailed block diagram version of the halftoning process depicted in FIG. 3.

Reference should now be made to FIG. 4 which depicts a detailed block diagram version of halftoning process 301 depicted in FIG. 3. In particular, FIG. 4 depicts normalizer 400, modulator 401 and uniform quantizer 402, all being serially connected. In general, these blocks perform the basic functions of a halftoning system (bi-tonal or multi-level).

Specifically, normalizer 400 converts the input intensity values into values between 0 and 1. Subsequently, modulator 401 maps the normalized intensity values into pixel values using a set of TTFs. Lastly, each pixel value is quantized by quantizer 402 into one of a plurality of levels, $L_y+1$, prior to placement in a plurality of halftone cell pixel locations.

To insure that the digital output of modulator 401 (in a normalized sense) preserves the mean of the digital input signal, the teachings of the Incorporated Application described the following mean preserving constraint:

$$P = dv/du$$

where P is the number of positions in the halftone cell, with $0<=u<=1$ and $0<=v_i<=1$.

Using this constraint, the Incorporated Application teaches generating a set of TTFs, with one TTF for each position in the halftone cell. These TTFs are then uniformly quantized for the number of output levels to determine the threshold values used to fill the threshold matrices shown in FIG. 2.

For a system that uses a halftone cell with P positions, the number of threshold values, T, needed to fill the threshold matrices, is given by the formula: $T=PL_y$.

The Incorporated Application describes a method of determining each of the T thresholds and assigning them to the threshold matrices. In particular, the Incorporated Application teaches generating a set of mean preserving TTFs, $v_i$, one for each of the P positions in the halftone cell, and uniformly quantizing these functions to create a new set of transfer functions, $v_i'$.

Figure 5:
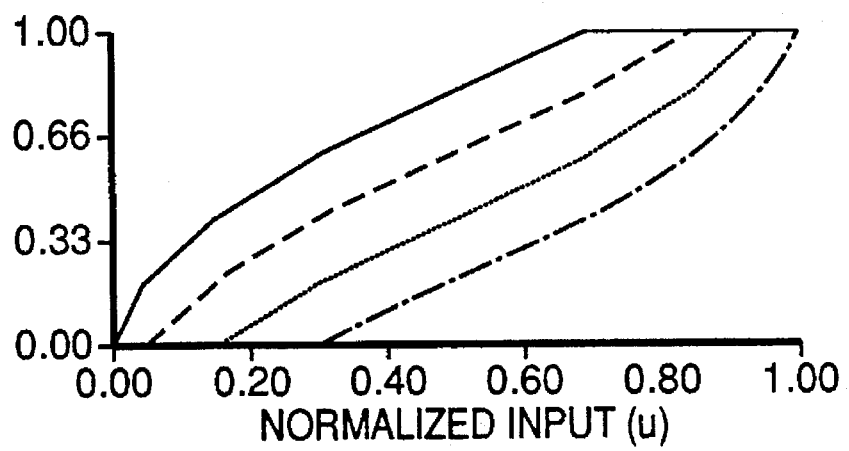
FIG. 5 depicts an illustrative set of mean-preserving TTFs of the type that may be generated utilizing the teachings of the Incorporated Application.

Reference should now be made to FIG. 5 which depicts an illustrative set of mean-preserving TTFs, $v_i$, of the type that may be generated utilizing the teachings of the Incorporated Application when P=4.

Figure 6:
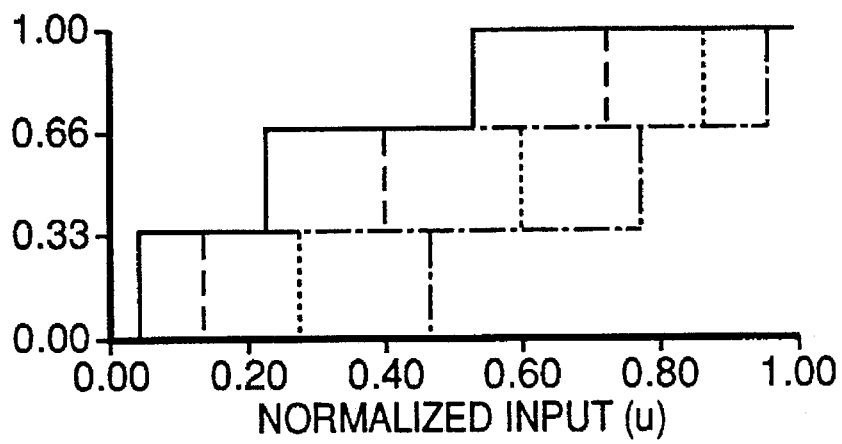
FIG. 6 depicts the quantized versions of the TTFs depicted in FIG. 5 utilizing the quantization teachings set forth in the Incorporated Application.

When these TTFs, $v_i$, are applied to a system that can generate four output levels ($L_y$=3), the resulting uniformly quantized TTFs, $v_i'$ (as taught in the Incorporated Application), are shown in FIG. 6.

The resulting quantized transfer functions are good approximations of the desired normalized TTFs (the best approximations possible when the TTFs are generated independently); but they do not minimize the total quantization error for the system.

Figure 7:
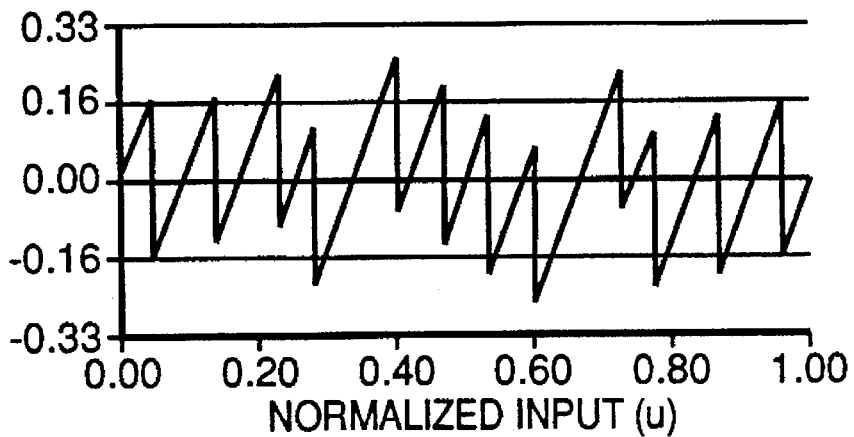
FIG. 7 depicts the total quantization error between the normalized TTFs depicted in FIG. 5 and the quantized TTFs depicted in FIG. 6, when quantizing is performed according to the teachings of the Incorporated Application.

Reference should now be made to FIG. 7 which, as indicated hereinbefore, depicts the total quantization error between the normalized TTFs depicted in FIG. 5 and the quantized TTFs depicted in FIG. 6, when quantizing is performed according to the teachings of the Incorporated Application.

It should be noted that the slope of the error between the quantization thresholds depicted in FIG. 6 is P based on the mean preserving condition taught in the Incorporated Application. Since the slope of the total error is constant (P), the total quantization error, according to the present invention, can be minimized by forcing the thresholds to occur at regular intervals.

According to a preferred embodiment of the present invention, the input variable range, u (shown in FIG. 6), is divided into T-subintervals and thresholds are selected in the centers of each interval.

The resulting thresholds, $t_i$ (the centers of the T-subintervals), are determined only by the number of thresholds required by the halftoning system, T, and are independent of the design of the TTFs. In ascending order, the thresholds $t_i$ are given by the formula:

$$t_i = (2i-1)/2T$$

where $1 <= i <= T$.

Figures 8, 9:
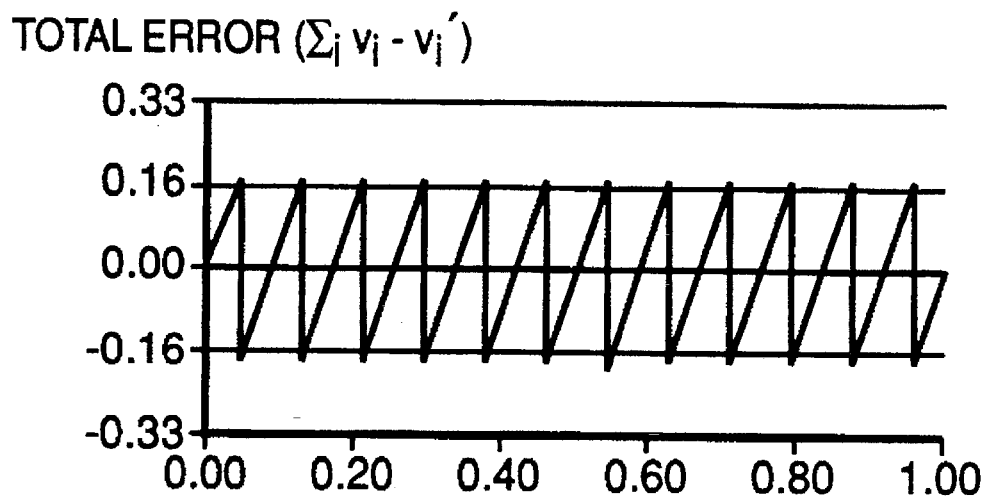
FIG. 8 depicts the total quantization error between the sets of TTFs depicted in FIG. 5 and FIG. 6 when quantizing is performed according to the teachings of the preferred (possibly computationally intensive) embodiment of the present invention.
FIG. 9 is a table illustrating threshold levels derived using the teachings of the Incorporated Application when applied to the TTFs depicted in FIG. 5 versus threshold values derived when utilizing the teachings of one embodiment (not computationally intensive) of the present invention applied to the same TTFs.

For the halftoning system described by FIGS. 5–7 the new minimized system quantization error is shown in FIG. 8 when quantizing is performed according to the teachings of the preferred (possibly computationally intensive) embodiment of the present invention.

To achieve the desired minimized system quantization error a set of quantized TTFs that best approximate the original TTFs must be created. One way of accomplishing this, according to a preferred embodiment of the invention, is by finding the assignment of new threshold levels to the threshold matrices (e.g., the matrices shown in FIG. 2), which minimizes the maximum quantization error between any quantized and unquantized TTF.

In other words, for each possible assignment, it is possible to define a cost value, c, that is defined as the maximum quantization error in the system, as follows:

$$c = \max(v_i(u) - v_i'(u)),$$

where $0 <= u <= 1$ and $1 <= i <= P$. The best assignment of threshold values is, according to the preferred embodiment of the invention, the one that produces the smallest cost value c.

For many halftoning systems, finding the best assignment of thresholds is a straight forward problem. However, in the general case, finding the optimum assignment van be difficult and requires a search for the minimum c value. For systems with large halftoning cells and many possible output levels, this search may require a very large number of calculations.

Alternate embodiments of the present invention are directed to computationally efficient processes for assigning the thresholds to the threshold matrices. Although they do not guarantee the optimum solution, they will significantly reduce overall system quantization error.

According to one embodiment of the invention, a process for assigning the required thresholds to the threshold matrix is to perform the quantization described in the Incorporated Application and then remap these thresholds to the threshold levels which are the centers of the T-subintervals.

An exemplary embodiment of this process includes the following steps:

(1) uniformly quantize each of the TTFs as described in the incorporated application;

(2) sort the resulting quantization boundaries (QBs) for all of the TTFs in ascending order. If two or more QBs have the same value, subsort the these QBs (in ascending order) by the position index of the TTF;

(3) compare this list of QBs with a sorted list of required thresholds (centers of T-subintervals); and (4) replace the QBs with the required thresholds.

FIG. 9 is a table illustrating the results of this procedure (which is not as computationally intensive as the previously described preferred embodiment of the invention) for the system shown in FIGS. 5–7 assuming the input axis is scaled to 8 bits.

More particularly, the table in FIG. 9 lists the threshold levels derived using the teachings of the Incorporated Application when applied to the TTFs depicted in FIG. 5 versus threshold values derived when utilizing the teachings of the alternative embodiment of the present invention (described hereinabove) applied to the same TTFs.

The "threshold position" referred to in FIG. 9 refers to the threshold matrices depicted in FIG. 2. Each threshold position (location) is listed as the threshold matrix number followed by the position in the matrix.

A further alternate embodiment of the present invention for assigning the thresholds is to loop through the thresholds and assign the threshold to the TTF with the largest error. The following is an exemplary process illustrating this alternate embodiment of the present invention:

(1) start with the first threshold (l=1);

(2) for each TTF, calculate the difference between the original function value and the current quantized value $[v_i(t_1) - v_i'(t_{1-1})]$ assuming that $v_i'(t_0) = 0$;

(3) assign the threshold to the TTF with the largest error and increase the value of the corresponding quantized TTF by one modulation level;

(4) move to the next threshold (l=l+1);

(5) if not done (1<=P), then jump to step 2.

Figures 10, 11:
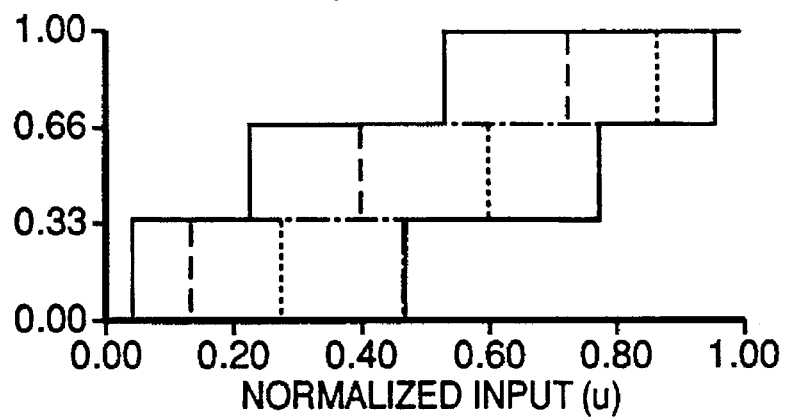
FIG. 10 is a table illustrating threshold values derived when utilizing the teachings of an alternate embodiment (also not computationally intensive) of the present invention applied to the TTFs depicted in FIG. 5. Also depicted are the quantization errors for each of the TTFs depicted in FIG. 5 when utilizing the aforementioned alternate embodiment.
FIG. 11 depicts the quantized versions of the TTFs depicted in FIG. 5 utilizing the non-compute intensive quantization teachings set forth in the present application.

FIG. 10 is a table illustrating threshold values derived when utilizing the teachings of this further, (non-computationally intensive), alternate embodiment of invention applied to the TTFs depicted in FIG. 5. Also depicted in FIG. 10 are the quantization errors for each of the TTFs depicted in FIG. 5 when utilizing this further alternate embodiment of the invention.

The "threshold position" referred to in FIG. 10 refers once again to the threshold matrices depicted in FIG. 2, with each threshold location being listed as the threshold matrix number followed by the position in the matrix.

Finally, both of the alternate embodiments of the invention, as described hereinabove, result in the same set of quantized TTFs. FIG. 11 depicts the quantized versions of the TTFs depicted in FIG. 5 utilizing the processes contemplated by the alternative embodiments of the invention.

What has been described in detail hereinabove are methods and apparatus meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

It is, therefore, to be understood that the claims appended hereto are intended to cover all such modifications and variations which fall within the true scope and spirit of the invention.

| PARTS LIST | |
| --- | --- |
| 101 | comparator |
| 102 | gray level image |
| 103 | threshold matrix |
| 104 | pixel location |
| 105 | outputting |
| 201-1-201-Ly | comparators |
| 203-1-203-Ly | matrices |
| 204 | link |

-continued

| PARTS LIST | |
|---|---|
| 301 | function |
| 400 | normalizer |
| 401 | modulator |
| 402 | uniform quantizer |

We claim:

1. A method for quantizing a given set of P normalized continuous mean preserving Tone Transfer Functions (TTFs), $v_i$ with $1<=i<=P$, for a multilevel halftone system having a predetermined halftone cell size of P, for converting each member, x, of a set of input contone representative intensity values into a predetermined number of available micro output levels, $L_y+1$, comprising the steps of:

(a) dividing the range of possible input contone representative intensity values into T subintervals where $T=PL_y$;

(b) determining the values of the centers of the T-subintervals; and (c) quantizing each of said normalized continuous mean preserving TTFs as a function of the values of the centers of the T-subintervals.

2. A method as set forth in claim 1 wherein said step of quantizing is performed such that the quantized TTFs approximate said normalized continuous mean preserving TTFs.

3. A method as set forth in claim 2 wherein said step of quantizing satisfies the criteria that the maximum quantization error between any quantized and unquantized TTF is minimized thereby minimizing total system quantization error.

4. A method as set forth in claim 2 wherein said step of quantizing further comprises the steps of:

(a) uniformly quantizing each of said given P normalized continuous mean preserving TTFs independently to obtain a first set of quantization boundaries;

(b) sorting said first set of quantization boundaries in numerical order;

(c) subsorting said first set of quantization boundaries in numerical order by TTF index i, whenever at least two of said resulting boundaries in said first set of quantization boundaries have the same value; and (d) replacing at least one member of the resulting set of sorted boundary values with at least one member of the set of values of the centers of said T-subintervals.

5. A method as set forth in claim 2 wherein said step of quantizing further comprises the step of sequentially approximating at each quantization boundary the normalized continuous mean preserving TTFs.

6. A method as set forth in claim 5 wherein said step of sequentially approximating further comprises the steps of:

(a) sorting the values of the centers of said T-subintervals to create a list of T-subintervals centers in ascending order;

(b) calculating, at the first T-subinterval center in said sorted set of values, the difference between each normalized continuous mean preserving Tone Transfer Function and its quantized value at said first T-subinterval center;

(c) increasing the value of the quantized TTF, having the greatest difference as determined in step (b), by one modulation level; and (d) repeating steps (b) and (c) at the next T-subinterval center in said list for all entries in said list.

7. A method for determining threshold levels for assignment to a set of threshold matrices used for converting each member, x, of a set of input contone representative intensity values into a predetermined number of available micro output levels, $L_y+1$, for a multi-level halftone system having a predetermined halftone cell size of P, comprising the steps of:

(a) dividing the range of possible input contone representative intensity values into T subintervals where $T=PL_y$; and (b) setting said threshold values to be the values of the centers of the T-subintervals.

8. A method for determining threshold levels for assignment to a set of threshold matrices used for converting each member, x, of a set of input contone representative intensity values into a predetermined number of available micro output levels, $L_y+1$, for a multi-level halftone system having a predetermined halftone cell size of P, wherein said multilevel halftone system is defined by a given set of P normalized continuous mean preserving Tone Transfer Functions (TTFs), $v_i$ with $1<=i<=P$, comprising the steps of:

(a) dividing the range of possible input contone representative intensity values into T subintervals where $T=PL_y$;

(b) setting said threshold values to be the values of the centers of the T-subintervals; and (c) assigning the values determined in step (b) to each threshold matrix in said set of threshold matrices so that the resulting set of matrices represent quantized TTFs which approximate the given set of P normalized continuous mean preserving TTFs.

9. A method as set forth in claim 8 wherein said quantized TTFs which approximate the given set of P normalized continuous mean preserving TTFs satisfies the criteria that the maximum quantization error between any quantized and unquantized TTF is minimized thereby minimizing total system quantization error.

10. A method as set forth in claim 8 wherein said quantized TTFs which approximate the given set of P normalized continuous mean preserving TTFs are determined by a process comprising the steps of:

(a) uniformly quantizing each of said given P normalized continuous mean preserving TTFs independently to obtain a first set of threshold values;

(b) sorting said first set of threshold values in numerical order;

(c) subsorting said first set of threshold values in numerical order by TTF index i, whenever at least two of said resulting thresholds in said first set of threshold values have the same value; and (d) replacing at least one member of the resulting set of sorted threshold values with the values of the centers of said T-subintervals.

11. A method as set forth in claim 8 wherein said quantized TTFs which approximate the given set of P normalized continuous mean preserving TTFs are determined by sequentially approximating at each threshold value the normalized continuous mean preserving TTFs.

12. A method for determining look-up table values for assignment to a set of look-up tables used for converting each member, x, of a set of input contone representative intensity values into a predetermined number of available micro output levels, $L_y+1$, for a multi-level halftone system having a predetermined halftone cell size of P, wherein said multilevel halftone system is defined by a given set of P normalized continuous mean preserving Tone Transfer Functions (TTFS), $v_i$ with $1<=i<=P$, comprising the steps of:

(a) dividing the range of possible input contone representative intensity values into T subintervals where $T=PL_y$;

(b) determining the values of the centers of the T-subintervals;

(c) quantizing each of said normalized continuous mean preserving TTFs as a function of the values of the centers of the T-subintervals; and (d) assigning the quantized TTFs determined in step (c) to said set of look-up tables.

13. A method as set forth in claim 12 wherein said step of quantizing is performed such that the quantized TTFs approximate said normalized continuous mean preserving TTFs.

14. A method as set forth in claim 13 wherein said quantized TTFs which approximate the given set of P normalized continuous mean preserving TTFs satisfies the criteria that the maximum quantization error between any quantized and unquantized TTF is minimized thereby minimizing total system quantization error.

15. A method as set forth in claim 13 wherein said quantized TTFs which approximate the given set of P normalized continuous mean preserving TTFs are determined by a process comprising the steps of:

(a) uniformly quantizing each of said given P normalized continuous mean preserving TTFs independently to obtain a first set of boundary values;

(b) sorting said first set of boundary values in numerical order;

(c) subsorting said first set of boundary values in numerical order by TTF index i, whenever at least two of said resulting boundary values in said first set of quantization boundary values are equal; and (d) replacing at least one member of the resulting set of sorted boundary values with at least one member of the set of values of the centers of said T-subintervals.

16. A method as set forth in claim 13 wherein said quantized TTFs which approximate the given set of P normalized continuous mean preserving TTFs are determined by sequentially approximating at each boundary value the normalized continuous mean preserving TTFs.

17. A method for quantizing a given set of P normalized continuous mean preserving Tone Transfer Functions (TTFs), $v_i$ with $1<=i<=P$, for a multi-level halftone system having a predetermined halftone cell size of P, for converting each member, x, of a set of input contone representative intensity values into a predetermined number of available micro output levels, $L_y+1$, comprising the steps of:

(a) dividing the range of possible input contone representative intensity values into T regularly spaced subintervals where $T=PL_y$; and (b) quantizing each of said normalized continuous mean preserving TTFs at regular intervals as a function of said regularly space T-subintervals.

18. A method for determining threshold levels for assignment to a set of threshold matrices used for converting each member, x, of a set of input contone representative intensity values into a predetermined number of available micro output levels, $L_y+1$, for a multilevel halftone system having a predetermined halftone cell size of P, comprising the steps of:

(a) dividing the range of possible input contone representative intensity values into T regularly spaced subintervals where $T=PL_y$; and (b) setting said threshold values at regular intervals as a function of said regularly spaced T-subintervals.

19. A method for determining threshold levels for assignment to a set of threshold matrices used for converting each member, x, of a set of input contone representative intensity values into a predetermined number of available micro output levels, $L_y+1$, for a multilevel halftone system having a predetermined halftone cell size of P, wherein said multilevel halftone system is defined by a given set of P normalized continuous mean preserving Tone Transfer Functions (TTFs), $v_i$ with $1<=i<=P$, comprising the steps of:

(a) dividing the range of possible input contone representative intensity values into T regularly spaced subintervals where $T=PL_y$;

(b) setting said threshold values at regular intervals as a function of said regularly spaced T-subintervals; and (c) assigning the values determined in step (b) to each threshold matrix in said set of threshold matrices so that the resulting set of matrices represent quantized TTFs which approximate the given set of P normalized continuous mean preserving TTFs.

20. A method for determining look-up table values for assignment to a set of look-up tables used for converting each member, x, of a set of input contone representative intensity values into a predetermined number of available micro output levels, $L_y+1$, for a multilevel halftone system having a predetermined halftone cell size of P, wherein said multilevel halftone system is defined by a given set of P normalized continuous mean preserving Tone Transfer Functions (TTFs), $v_i$ with $1<=i<=P$, comprising the steps of:

(a) dividing the range of possible input contone representative intensity values into T subintervals where $T=PL_y$;

(b) setting said threshold values at regular intervals as a function of said regularly spaced T-subintervals; and (c) quantizing each of said normalized continuous mean preserving TTFs as a function of said regularly space T-subintervals; and (d) assigning the quantized TTFs determined in step (c) to said set of look-up tables.

* * * * *